(12) United States Patent
Sintorn et al.

(10) Patent No.: US 6,446,771 B1
(45) Date of Patent: *Sep. 10, 2002

(54) SHOCK ABSORBER

(75) Inventors: Torkel Sintorn, Stockholm; Oskar Löfgren, Solna, both of (SE)

(73) Assignee: Öhlins Racing AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,212

(22) Filed: Nov. 10, 1999

(30) Foreign Application Priority Data

Dec. 2, 1998 (SE) ................................. 9804165

(51) Int. Cl.$^7$ .................................................. F16F 9/48
(52) U.S. Cl. ................. 188/288; 188/319.1; 188/319.2; 188/314; 188/322.13
(58) Field of Search ............................... 188/282.6, 285, 188/289, 322.15, 322.22, 319.1, 319.2, 320, 304, 313, 314, 317, 284, 288, 322.13, 297; 267/64.11, 64.15, 64.22

(56) References Cited

U.S. PATENT DOCUMENTS

| 1,331,564 A | * | 2/1920 | Gruss ..................... 188/322.15 |
| 3,175,645 A | | 3/1965 | Schäfer et al. ............ 188/282.6 |
| 3,447,644 A | * | 6/1969 | Duckett ........................ 188/315 |
| 3,726,368 A | * | 4/1973 | Taylor ........................ 188/289 |
| 4,230,309 A | * | 10/1980 | Schnitzius ............... 267/64.22 |
| 5,157,806 A | | 10/1992 | Wartian ................... 267/64.11 |
| 5,409,087 A | | 4/1995 | Angermann et al. | 
| 5,810,128 A | | 9/1998 | Eriksson et al. ............ 188/289 |
| 5,823,306 A | | 10/1998 | de Molina |

FOREIGN PATENT DOCUMENTS

| EP | 0 565 832 | 10/1993 |
| EP | 0 816 712 | 1/1998 |
| GB | 925877 | 5/1963 |
| GB | 1 305 311 | 4/1970 |
| GB | 2 202 921 | 3/1987 |
| GB | 2202921 | 10/1988 |

* cited by examiner

*Primary Examiner*—Jack Lavinder
*Assistant Examiner*—Thomas J. Williams
(74) *Attorney, Agent, or Firm*—Connolly Bove Lodge & Hutz LLP

(57) ABSTRACT

A shock absorber is made with a bleed function and preferably a non-return valve function associated with the bleed function. The shock absorber has a cylinder (3) and, working in the latter in working medium and arranged on a piston rod (4), a piston arrangement. The latter comprises at least two first and second pistons (5, 6) arranged at a distance from one another on the piston rod. At least one piston (5) can, in connection with an end position, be introduced into a first space so as, depending on its position in or at the space, to bring about a modified or varied damping force relative to when the piston is located outside the space. The piston rod (4) is provided with an inner second space (15) which is arranged so as to contain said bleed and/or non-return valve function. Additionally or alternatively, the piston (6) working outside the first space is provided with a member performing a bleed function and with any associated non-return valve function.

22 Claims, 5 Drawing Sheets

SHOCK ABSORBER

TECHNICAL FIELD

The present invention relates to a shock absorber which works with a bleed function. In this connection, the bleed function can interact with a non-return valve function. In certain embodiments, the shock absorber is preferably arranged so as to have both the bleed and the non-return valve functions. The shock absorber is also of the type which has a cylinder and, working in the latter in working medium and arranged on the piston rod, a piston arrangement which comprises at least two first and second pistons arranged at a distance from one another. At least one of said pistons can, in connection with an end position in the cylinder or the shock absorber, be introduced into a first space so as, depending on its position in or at the space, to bring about a modified or varied damping force compared with the case when the piston in question is located outside the space.

STATE OF THE ART

This type of shock absorber is previously known and reference can in this connection be made to inter alia U.S. Pat. No. 3,195,645. The present invention can be seen as a development in relation to this known shock absorber. The known shock absorber comprises a dual-piston arrangement in which the first or front piston enters and exits a cup-shaped container so as to bring about an increased damping force in the shock absorber end position concerned. A second piston of full-size diameter is made with fixed throttles via which the damping forces or damping capacity of the shock absorber can be implemented in positions outside said end positions. The known shock absorber also demonstrates that increased damping force can be obtained in both the end positions of the shock absorber.

Reference can also be made to UK Patent Specification 2 202 921 which indicates that, instead of a cup-shaped part which is arranged in the shock absorber end concerned, use can be made of a pin-shaped element which interacts with a recess in the piston rod end and in this way acts on an arrangement which increases the damping force via the shock absorber end concerned.

Reference can also be made very generally to European Patent Specification 565 832 B1.

It is also known per se to arrange for a bleed function in a shock absorber. What is known as return bleed is used in order to make the wheels of the vehicle follow the surface of the ground better. By arranging a bleed flow past a member which is arranged on the piston in question and acts on the medium, forward, upward and return (downward) movements are made easier. The use of a non-return valve in the return bleed makes possible separation of compression bleed and return bleed to different degrees, which can be selected depending on the non-return valve selected.

DESCRIPTION OF THE INVENTION

Technical Problem

It is desirable to be able, in accordance with said U.S. Patent Specification, to arrange a dual-piston arrangement of the type disclosed also on those types of shock absorber which have on the one hand a cylinder for a piston rod and a dual-piston arrangement in working medium essentially in the form of hydraulic oil, and on the other hand a container for an accumulator function, which is connected to the cylinder via an intermediate part, a hose or a pipe connection etc. In this respect, it is essential to be able to arrange an appropriate bleed function, if appropriate together with a non-return valve function, in the structure so that an integrated construction which functions well is obtained. The invention aims to solve this problem inter alia.

In the use of a bleed or non-return valve function, it is often advantageous to be able to arrange the member performing the bleed function so that regulatability or adjustability can be achieved. It is to be possible to implement this adjustability by means of members known per se in a manner known per se. The invention solves this problem also.

As claimed in the present invention, it is also desirable that dual-piston and bleed and non-return valve arrangements can work with a piston function provided with shims, by means of which a speed-dependent damping force function can be achieved. The invention solves this problem also.

In connection with said UK Patent Specification, the arrangement of a conical pin-shaped element involves a problem associated with being able to use the interior of the piston rod for mounting and positioning members which can effect said bleed and/or non-return valve functions. The invention solves this problem also and indicates a basic structure with a cup-shaped element as claimed in said U.S. Patent Specification or a corresponding arrangement.

In connection with the device or shock absorber as claimed in said UK Patent Specification, there is also a problem associated with being able to clearly and unambiguously separate the functions of the first and second pistons. As claimed in the invention, the first piston is to be capable of effecting its end damping force function without being influenced by the second piston. The invention solves this problem also by proposing a basic concept based on the U.S. Patent Specification.

As claimed in the invention, seat and nozzle functions are to be arranged for effecting said bleed function. The invention solves this problem also and proposes in this connection a unique arrangement for a piston rod, construction and arrangement of the second piston with its associated shims and also construction and arrangement of the first piston on the piston rod.

There is also a requirement to be able to use alternative constructions and functions in connection with the bleed function in a shock absorber of said type with a dual-piston arrangement and shims arranged on the latter. The invention solves this problem also and proposes an alternative or additional arrangement in which the bleed function is separated from or integrated with the non-return valve function.

The Solution

A shock absorber of the type described in the introduction can be considered to be mainly wherein either the piston rod is provided with an inner second space which is arranged so as to accommodate said bleed function and any non-return valve function arranged with the latter, or the second piston is made with a bleed function and any non-return valve function interacting with the latter.

In developments of the inventive idea, it is proposed that said first space is to be arranged in a cup-shaped or sleeve-shaped part which is located in said end position in question in the cylinder or the shock absorber. In this connection, a cup-shaped or sleeve-shaped part can be located in each end position in the cylinder. The first cup-shaped part can then serve the first piston in the first end position, and the second cup-shaped part can serve a third piston in the second end position. Said first and/or third piston can then have a sleeve-shaped part which, in the end position in question, is involved in forming said first space in the end position concerned. An alternative to forming the first space with a cup-shaped part is to make the cylinder wall with a thickened wall in the portion concerned.

In further embodiments, both a member performing the bleed function and a member performing the non-return valve function are arranged in the second space. In this connection, the member performing the bleed function can be arranged so that it can be controlled in order to obtain a bleed function which can be regulated by controls. The second space can also consist of a recess extending in the longitudinal direction of the piston rod, at the first end of which the member performing the bleed function is arranged and in which an operating rod extending in the recess, toward the second end of the recess, is arranged. At said second end, the operating rod can be acted on by means of a wheel or equivalent adjusting member. The member performing the non-return valve function is located outside the member performing the bleed function, that is to say closer to the free end of the piston rod in a case where the outer piston of the piston arrangement or the first piston can be introduced into the cup-shaped or sleeve-shaped part. The latter part can be arranged with a side gap or side hole which preferably extends in the longitudinal direction of the cylinder and via which the cylinder space in front of the second piston can be connected by one or more ducts to an accumulator container arranged separately in relation to the cylinder. The second space or recess can also be connected, via one or more first passages or side holes in the piston rod wall, to the space outside the outer wall of the piston rod between the first and second pistons. The second space can also be connected, via one or more second passages or side holes in the piston rod wall, to the space outside the piston rod behind the second and, respectively, in front of the third piston. When an expansion movement takes place, the bleed function is activated by virtue of the fact that working medium can pass from the upper side of the second piston, to each second passage or side hole, onward via the member performing the bleed function, to each first passage or side hole, and out at the front side of the second piston. When a compression movement takes place, the member performing the non-return valve function prevents the working medium flowing via the member performing the bleed function. Alternatively, the non-return valve arrangement can act on the passage for the working medium relative to when an expansion movement takes place, it being possible to make the passage smaller or larger.

In other developments of the inventive idea, the first or front piston, that is to say the piston closest to the free end of the piston rod, has a diameter which corresponds to the diameter of the first space and is smaller than the diameter of the rest of the cylinder part. The first piston is also made with first working medium passages which are used essentially in the position of the first piston in the first space. The working medium flows via the working medium passages when the first piston is working in the cup-shaped or sleeve-shaped part. The second piston has on the one hand a diameter corresponding to the full-size diameter of the cylinder, and on the other hand second working medium openings, at which shims or shim packs are arranged on the lower and upper sides of the second piston. A continuous damping-force regulation function is therefore afforded by means of the shims or shim packs of the second piston, and increased end position damping is effected by means of the position of the first piston in or at the first space. The shock absorber can be intended for use on a motorcycle or a two-wheeled or three-wheeled vehicle. The shock absorber can also be used to form part of a car or a four-wheeled vehicle.

In one embodiment, the piston rod consists of a first piston rod part which, at the front, is made with a part of reduced diameter, on which the second piston is mounted. The piston rod can also comprise a second piston rod part of bushing-like design, in which the part of reduced diameter extends. Furthermore, the shims or shim packs of the second piston on the upper and lower sides of the second piston can be secured by means of a disc-shaped element positioned between a transition at the part of reduced diameter and the shim or the shim pack on the upper side of the piston. An end surface on the second piston rod part can bear against the shim or shim pack on the lower side of the second piston. The second piston rod part bears the first piston on a spindle-shaped portion of reduced diameter, at the end of which a securing member is arranged, for example a nut (lock nut), so as to press together in the axial direction and hold together the piston rod parts and the first and second pistons and also the shims/shim packs of the second piston and said disc-shaped element. In a preferred embodiment, the first and second piston rod parts form portions of the second space. In that portion of the second space formed by the first piston rod part, a nozzle with a seat is positioned, which forms said member performing the bleed. In this connection, the first and second passages or side holes as claimed in the above can be located on each side of the nozzle. In one embodiment, use is made of a non-return valve which can be acted on by medium pressure on compression and when it is acted on closes a passage for the bleed flow. The non-return valve can have a bleed hole for said flow. The bleed flow passes via the bleed hole when the valve has closed said passage. In this way, different rates of bleed flow can be obtained on expansion and compression. When there is no bleed hole in the non-return valve, the bleed flow is prevented completely. In a further embodiment, the bleed member and any non-return valve member are positioned in the second piston by way of an additional or alternative arrangement.

Advantages

By means of the above, an advantageous construction of the shock absorber as such from an economic point of view is obtained. The new functions can be built into a shock absorber which can be of a type known per se, for example of the Öhlins Racing AB type of shock absorber designated 46PRC, 46HR, 46R etc. The bleed and/or non-return valve function can be adapted optimally to other functions in the shock absorber. The shock absorber can thus be provided with a bleed function and a non-return valve function which function as claimed in the requirements of the customer. The new functions can be built into modern shock absorbers such as those of said type. In this connection, it is essential that shock absorbers with accumulators can be provided with the new functions. For example, it is to be possible for the bleed function to be present when an expansion movement takes place in the end position concerned, while it is prevented or acted on/modified when compression movement takes place in said end position. When a non-return valve is used, this can be arranged to have a bleed hole for the bleed flow or can be without such a bleed hole, that is to say the bleed function is prevented on compression. Alternatively, non-return valves with bleed holes of different size for acting on the bleed flow to varying degrees on compression can be arranged. A non-return valve with a suitable bleed hole or without a bleed hole is selected by testing. The selection depends on the travelling position the driver wants for the vehicle. In the curve chart in question, the bleed range is up to 0.4 m/s with variations upward and downward in the speed range, depending on which shim pack and bleed needle size are used. The selection depends on the situation, the driver and the vehicle. On the shock absorbers available from Öhlins Racing AB, 3.2 and respectively 4.0 mm return bleed needles are used with nozzles. Quite generally, use is made of a larger needle/nozzle and vice versa. With the bleed function, the damping force is reduced around the zero range.

DESCRIPTION OF THE FIGURES

A for the present proposed embodiment of a shock absorber which has the significant characteristics of the invention will be described below with simultaneous reference to the appended drawings, in which:

FIG. 3a shows a basic end view of the shock absorber parts as claimed in FIG. 3.

DETAILED EMBODIMENT

Figure 1:
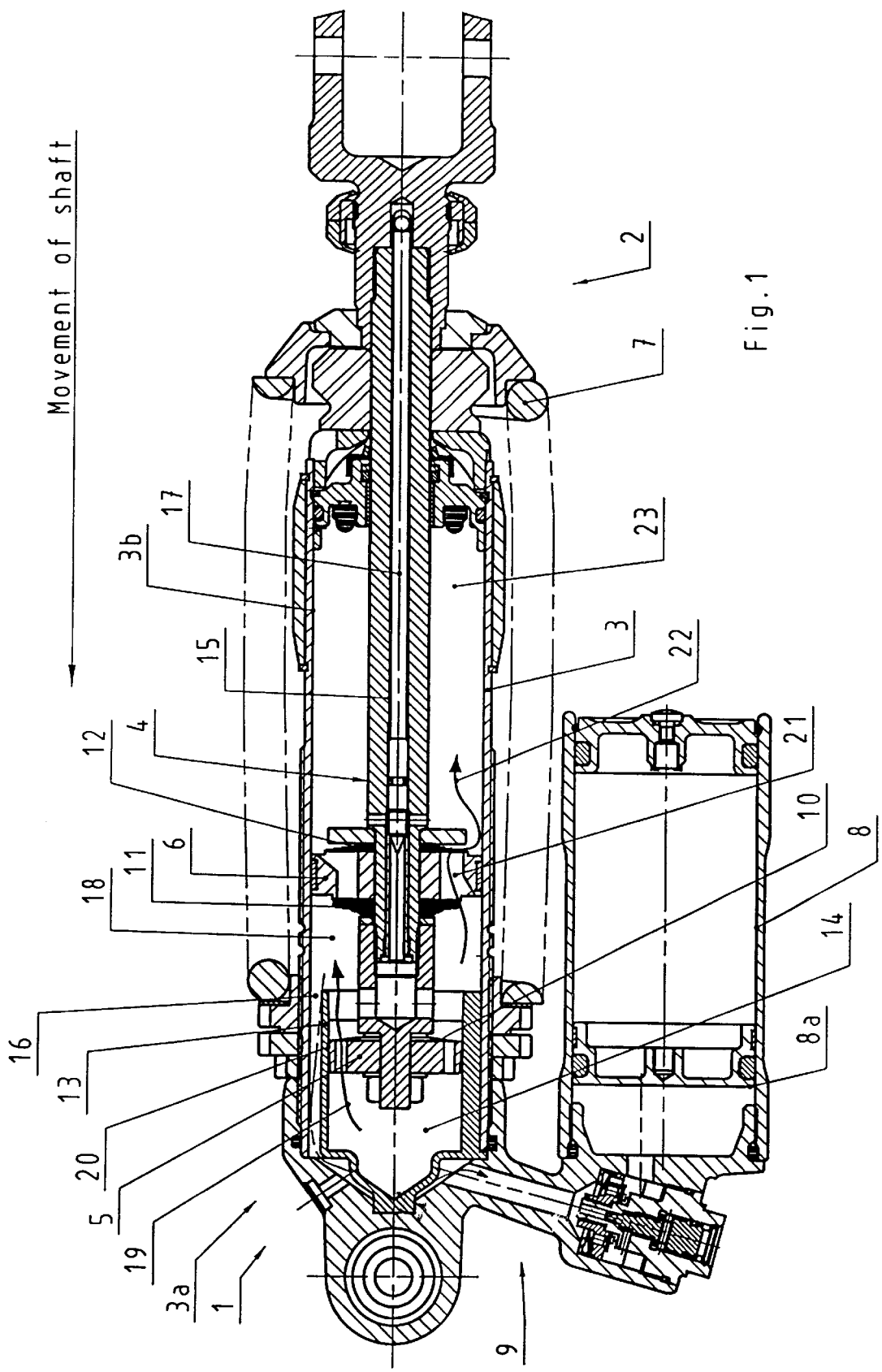
FIG. 1 shows in longitudinal section a shock absorber with a cup-shaped element in the inner end position, where a first piston in a piston arrangement on a piston rod takes up a position in the space of the cup-shaped part during an ongoing compression movement.

The invention can be used on a shock absorber of the type 46PR, 46UR, 46R available from Öhlins Racing AB on the general market. The shock absorber is well-known per se and comprises first fastening and bearing parts 1 and second fastening and bearing parts 2. Via the first bearing parts, the shock absorber is connected to a chassis, while the second bearing parts are connected to a wheel. The shock absorber comprises a cylinder 3 and a piston rod 4 which works in the latter and has a piston arrangement with a first piston 5 and a second piston 6. The shock absorber is also provided with a main spring 7 and an accumulator container 8 which is connected to the cylinder 3 via a connecting arrangement 9.

The first piston is provided with one or more shim(s) 10 on its upper side and, if appropriate, on its lower side also (not shown), while the second piston 6 is provided with shims or shim packs 11 and 12 on its lower side and, respectively, its upper side. The cylinder 3 is provided at its end 3a with an internally cup-shaped or sleeve-shaped element 13 which has a space 14, here referred to as the first space. The piston rod is provided with an inner space 15, here referred to as the second space. The second space extends centrally and concentrically essentially throughout the longitudinal direction of the piston rod. Arranged between the cup-shaped part 13 and the inner wall 3b of the sleeve is or are one or more side openings or side holes 16 which extend in the longitudinal direction of the shock absorber parallel to the central axis 17 of the shock absorber. By means of each side hole, the space 18 in the cylinder, in front of the second piston 6, is connected to the accumulator 8 via a duct system in the intermediate part 9. The duct system connects the inner parts of the container to said space 18 in a manner known per se. The accumulator container 8 comprises a floating piston 8a which separates a gas volume and a hydraulic oil volume inside the container 8.

In FIG. 1, the first piston 5 is located in the recess 14. The shock absorber is shown during an ongoing compression movement in which the first piston is moving inward into the space 14 (toward the left in the figure). In this connection, a flow direction for the working medium (hydraulic oil) is shown by the arrow 19 and liquid passes the shim/shim pack 10 via one or more openings 20 in the piston 5. The working medium flows from the space 14, via the opening(s) 20, to the cylinder space 18 in front of the second piston 6. This is provided with one or more opening(s) 21, via which the medium 22 flows from the space 18 to a space 23 in the cylinder, above the second piston. In doing so, the medium passes the shim or shim pack 12. By means of the shim/shim pack, a speed-dependent damping force is obtained in a manner known per se.

Thus, as shown in FIG. 1, space 14 defines or make up a first fluid (or medium) chamber, space 18 makes up a second fluid (or medium) chamber, and space 23 makes up a third fluid (medium) chamber.

When the first piston also takes up a position outside the space 14, that is to say outside the cup-shaped part 13, the damping force of the shock absorber is brought about essentially by the second piston. When the first piston enters the cup-shaped part, an increased end damping force function is obtained, which depends on the dimensioning of the first piston with regard to the opening(s) 20 and the shim(s) 10. The second piston occupies a position outside the cup-shaped part the whole time.

Figure 2:
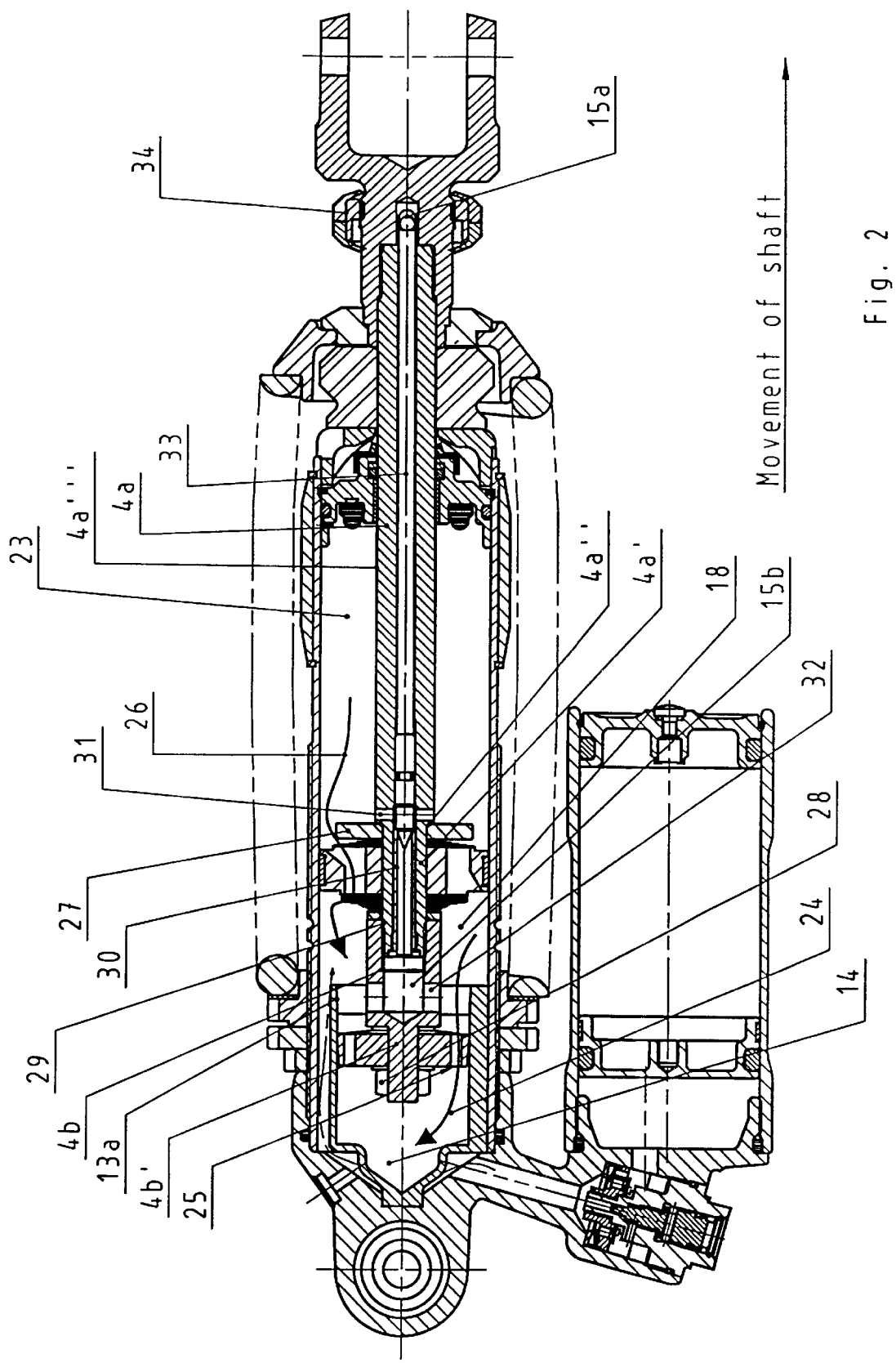
FIG. 2 shows in longitudinal section the shock absorber as claimed in FIG. 1 but where the shock absorber has started to perform an expansion movement.

FIG. 2 shows an expansion movement in the shock absorber end position concerned, that is to say the first piston is moving out of the space or toward the right in the figure. The medium direction from the space 18 to the space 14 is shown by 24. In this case also, the medium is acted on by the shim(s) on the first piston and thus passes the shim damping through the opening(s) concerned. In this direction, the shims do not produce any greater damping force level on account of the cavitation risk in the space 14 (compare gas pressure x effective piston area). The medium direction from the space 23 to the space 18 through the second piston is shown by 26. This medium flow 26 is damped by the shim or shim pack 11 on the lower side of the second piston.

The piston rod 4 as claimed in FIG. 1 is divided into two piston rod parts 4a and 4b. The first part 4a is essentially tubular and has a front part 4a' of reduced diameter. The second piston rod part 4b is designed with a bushing-like shape and, at the front, has the shape of a front spindle 4b' of reduced diameter. The second piston is mounted on the part 4a' and its shim or shim pack on the upper side is fixed by means of a disc-shaped element 27 which bears against a stop surface 4a" on the first piston rod part 4a. The first piston with its associated shim(s)/shim pack(s) is mounted on the part 4b' which, at its outer end, can interact with a locking member 28, for example a lock nut, weld joint etc. The bushing-shaped second piston rod part presses from underneath against the lower shim/shim pack of the second piston. A connection 29 between the piston rod parts can consist of a sliding connection. The parts and components shown are thus held together by means of an axial locking force effected by the locking member 28. The cup-shaped part 13 has an internal entry bevel 13a for the first piston which, alternatively or additionally, can be provided with a corresponding or similar entry bevel.

The second space 15 can be considered to consist of two part spaces 15a and 15b, 15a extending in the piston rod part 4a and 15b in the piston rod part 4b. In this connection, a nozzle 30 which performs the bleed function is arranged in the recess 15a in the front part 4a" of the piston rod part 4a. The part space 15a is connected to the outside 4a" of the piston rod 4 and the space 23 above the second piston 6 via a passage or passages or a side hole or side holes 31 in the piston rod wall. Said side hole(s) 31 open(s) directly above the disc-shaped element 27/the second piston. The part space 15b is connected via a passage or passages or a side hole or side holes 32 in the piston rod wall to the space 18 between the first and second pistons.

The above arrangement means that during the expansion movement of the shock absorber as claimed in FIG. 2, the bleed flow can flow between the space 23, via the member 30 performing the bleed function and the part space 15b and the side hole(s) 32, and the space 18.

Arranged in the second space is a rod 33 which extends to the second end of the second space, at which the rod is arranged so that it can be acted on by an operating member 34. In an exemplary embodiment, the rod is displaced longitudinally depending on a rotary movement of the member 34. The member 34 can be in the form of a wheel. By means of the member and the rod, the bleed function can be made regulatable or adjustable (in a manner known per se).

Figure 3:
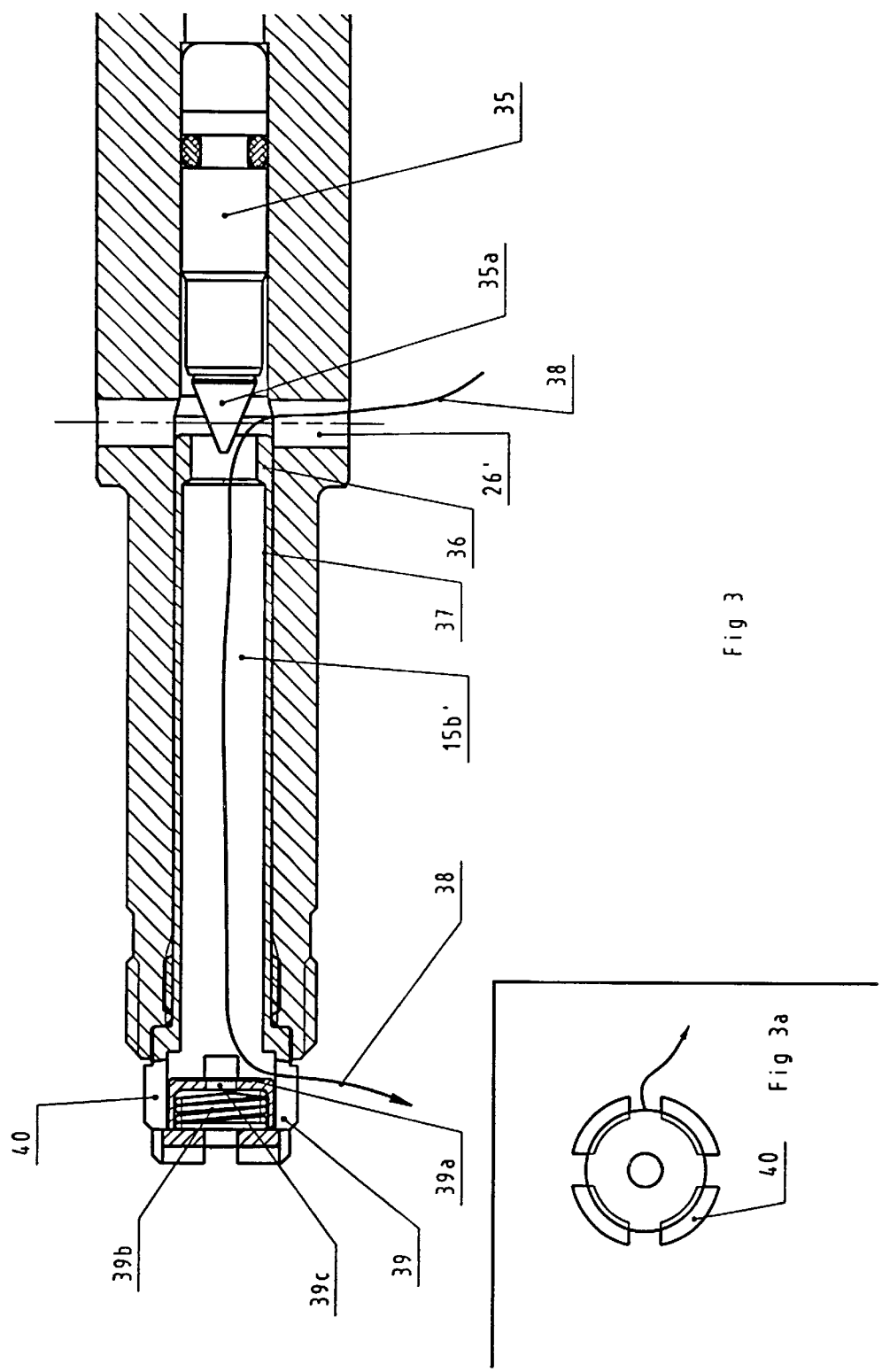
FIG. 3 shows in longitudinal section, and in a simplified and enlarged manner compared with FIGS. 1 and 2, a bleed and non-return valve arrangement in the piston rod, which arrangement is an alternative embodiment to that shown in FIGS. 1 and 2, in addition to which a bleed flow is shown during the expansion stroke of the shock absorber.

FIG. 3 shows an alternative embodiment of the parts concerned in detail. For the sake of clarity, only the front parts of the piston rod (without pistons) have been included. A member performing the bleed function is shown by 35. A part bearing a seat 36 is shown by 37. A front part 35a is tapered or conical and can interact with the seat 36. In FIG. 3, the part 35 is shown in the open position, while FIGS. 1 and 2 show the (corresponding) part in the closed position. Depending on the position of longitudinal displacement of the part 35 (35a), different quantities of bleed flow 38 can pass between the part 35/35a and the seat 36. As claimed in the above, the bleed flow passes via the passage(s) 26' and into the space 15'. The member 35 performing the bleed function can be of the same or similar design in FIGS. 1 and 2.

Arranged at the other end of the space 15b' is a non-return valve 39 which acts on the bleed flow. The non-return valve arrangement comprises a cup-shaped part 39a and a spring 39b. When an expansion movement takes place in the shock absorber as claimed in FIG. 3, the bleed flow moves the cup-shaped part 39 to the left in the figure against the action of the spring 39a. This movement or displacement results in side openings 40 (compare also FIG. 3a) being exposed, and the bleed flow can pass out from the space 15b' to outside the piston rod (compare the description above for FIGS. 1 and 2).

Figure 4:
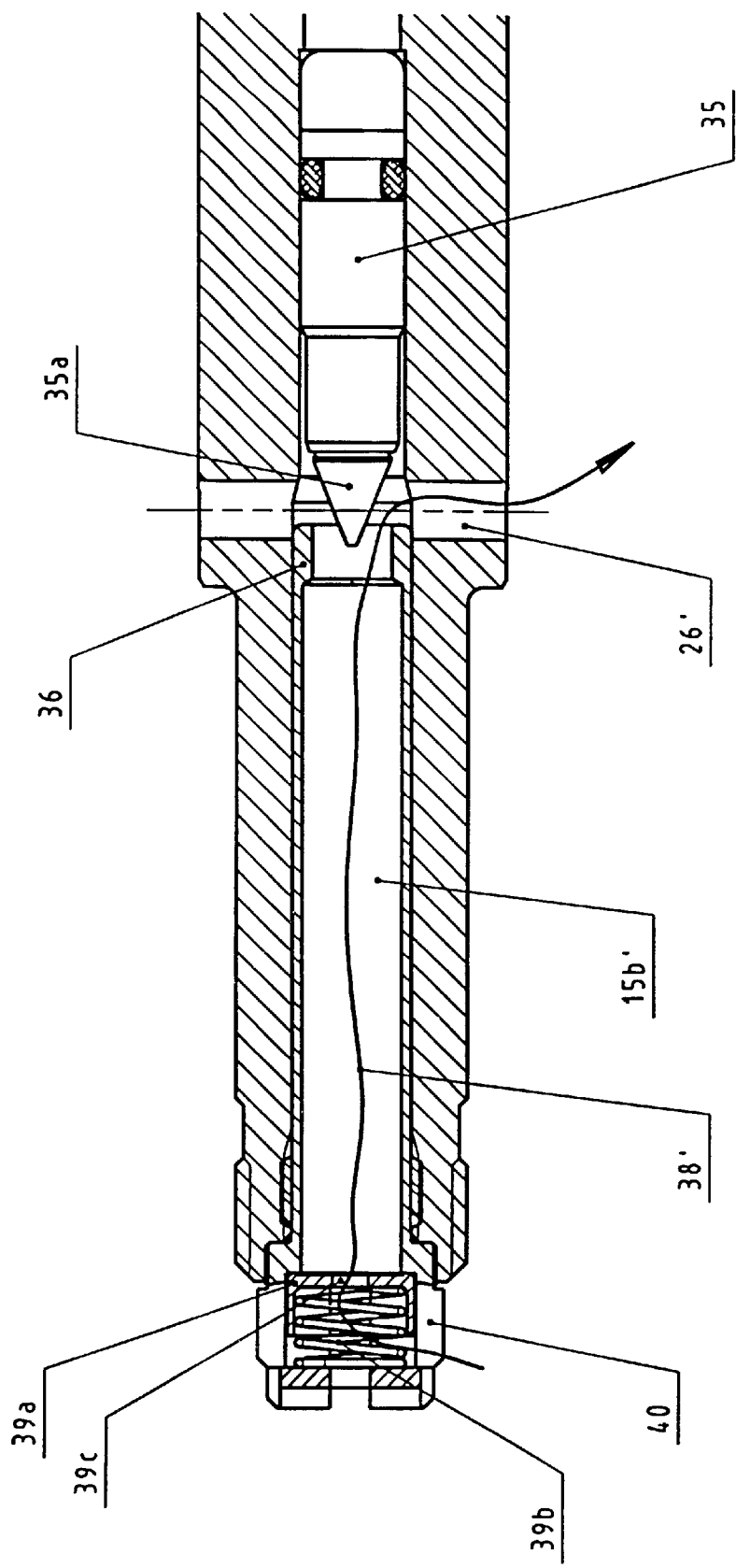
FIG. 4 shows the shock absorber parts as claimed in FIG. 3 but in the case of a bleed flow which occurs on compression of the shock absorber.

FIG. 4 shows the situation when the shock absorber performs a compression movement. In this case, the spring 39b moves the cup-shaped part 39a into a position in which the passages 40 are closed. The cup-shaped part can be provided with one or more bleed hole(s) 39c, via which the bleed flow 38' in the opposite direction can flow from the outside of the piston rod into the space 15b', via the seat 36 and the part 35a and out through the holes 26' (compare also the description for FIGS. 1 and 2). Different non-return valves can be provided with different numbers and sizes of bleed hole(s). A selection can then be made from among various non-return valves. In one embodiment, there are no bleed holes, and the flow 38' is then prevented completely.

Figure 5:
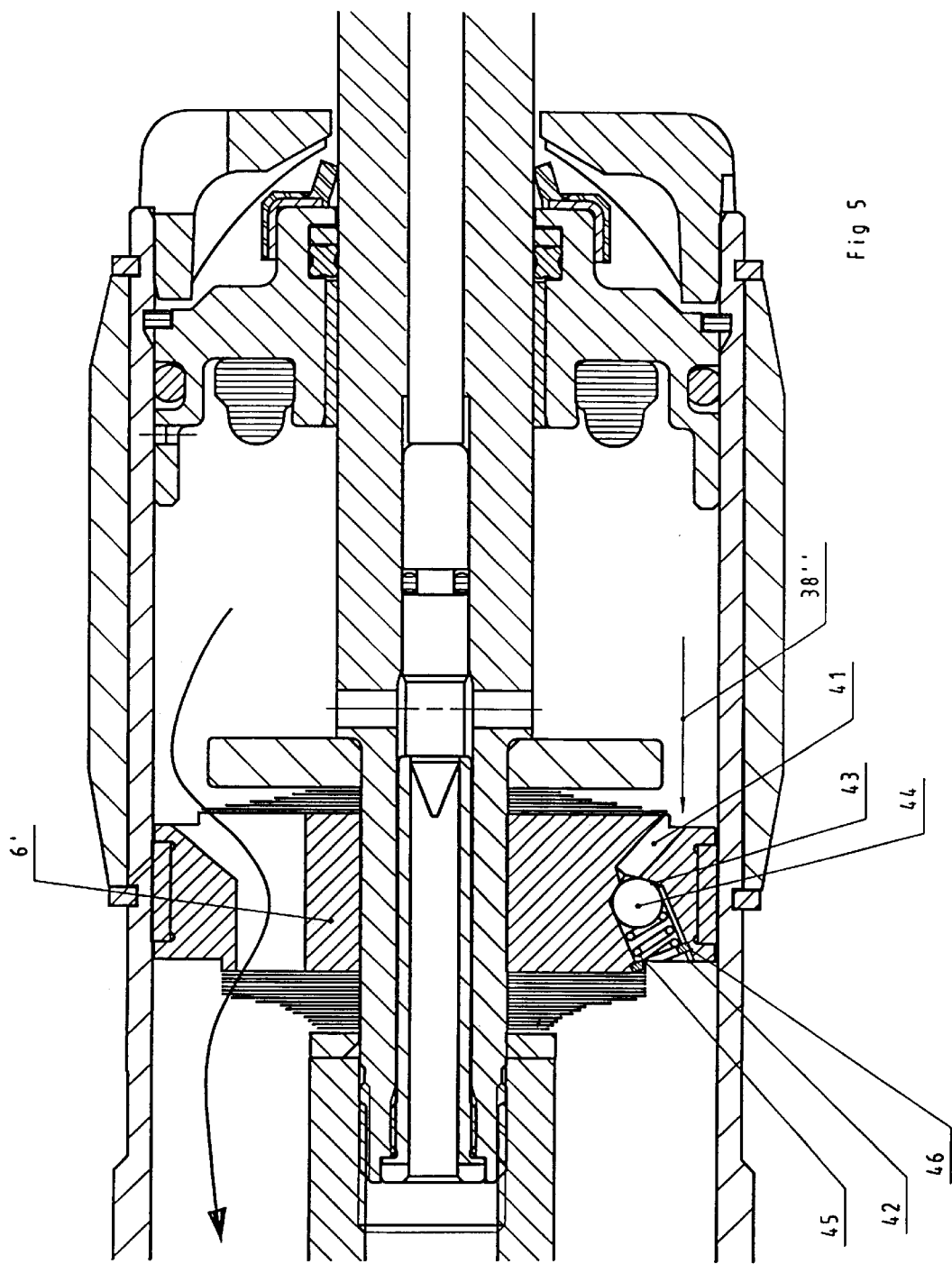
FIG. 5 shows an alternative or additional embodiment of the bleed function applied in the rear (second) piston of the shock absorber.

In FIG. 5, the second piston 6' is provided with openings 41 and 42, the opening 42 being provided with a seat formation for a ball 44 (or equivalent member). The member 44 is pressed against the seat by a spring 45 or equivalent element which is arranged in the opening 42 and retained in the latter by means of a washer 46 (perforated washer).

When expansion takes place in the shock absorber and the pressure above the piston 6' is increased or becomes greater than the pressure below the piston, the member 44 is moved against the action of the spring member 45, resulting in the bleed flow 38" being brought about between the seat 43 and the member 44. On compression, with the pressure conditions reversed on the upper and lower sides of the piston 6', the member 44 closes against the seat 43, no bleed flow opposite to the flow 38" then being capable of passing. Alternatively, the seat and/or the member 44 can be made so as to allow an opposite flow of modified magnitude in relation to the flow 38". Alternatively, a fixed passage can be arranged for such an opposite flow.

The invention is not limited to the embodiment described above but can be modified within the scope of the patent claims below and the inventive idea.

What is claimed is:

1. A shock absorber comprising:
   a cylinder defining an internal bore;
   a piston rod extending into the internal bore;
   first and second pistons fixedly attached to said piston rod and dividing the internal bore into at least first, second, and third fluid chambers said first piston having at least one opening that provides a fluid flow path between the first and second fluid chambers and regulates a damping force in a first end of said cylinder;
   at least one bleed means that provides a bleed flow path between the second and third fluid chambers, said bleed means being provided within said piston rod; and
   a cup-shaped element enclosing said first piston, and being provided in the first fluid chamber.

2. A shock absorber as recited in claim 1, wherein said piston rod includes a passageway longitudinally provided therethrough, the passageway having an operating rod extending therethrough, wherein the bleed means comprises a nozzle provided at one end of the passageway, a non-return valve being provided within the nozzle.

3. A shock absorber as recited in claim 2, wherein during compression of the shock absorber, a fluid is prevented from flowing through the nozzle by the non-return valve.

4. A shock absorber as recited in claim 2, wherein the cup-shaped element encloses an outer periphery of said first piston and is provided in the first end of said cylinder.

5. A shock absorber as recited in claim 4, wherein the cup-shaped element is smaller than the first end of said cylinder so that an opening is formed between a wall of said cylinder and the cup-shaped element.

6. A shock absorber as recited in claim 5, wherein the opening formed between the cylinder wall and the cup-shaped element provides fluid communication between the second fluid chamber and an accumulator container.

7. A shock absorber as recited in claim 1, wherein said piston rod includes a passageway longitudinally provided therethrough, the passageway having an operating rod extending therethrough, and the bleed means comprises a nozzle provided at one end of the passageway.

8. A shock absorber as recited in claim 7, wherein the passageway of said piston rod communicates with the third fluid chamber via at least one side hole formed in said piston rod, the at least one side hole being adjacent the nozzle.

9. A shock absorber as recited in claim 8, wherein during expansion of the shock absorber, a fluid flows from the third fluid chamber, through the side hole formed in said piston rod, through the nozzle, and to the second fluid chamber.

10. A shock absorber as recited in claims 1, wherein during expansion of the shock absorber, a fluid flows from the third fluid chamber, through the bleed means, and to the second fluid chamber.

11. A shock absorber as recited in claim 1, wherein during compression of the shock absorber, a fluid is prevented from flowing through the bleed means.

12. A shock absorber as recited in claim 1, wherein during compression of the shock absorber, a fluid flows from the first fluid chamber, through the at least one opening formed in said first piston, to the second fluid chamber.

13. A shock absorber as recited in claim 1, wherein during expansion of the shock absorber, a fluid flows from the second fluid chamber, through the at least one opening formed in said first piston, to the first fluid chamber.

14. A shock absorber as recited in claim 1, wherein said second piston includes at least one opening provided therein and shims arranged on an outer portion thereof.

15. A shock absorber as recited in claim 14, wherein the shims arranged on the outer portion of said second piston provide continuous damping force regulation of a fluid provided within the shock absorber.

16. A shock absorber as recited in claim 14, wherein said piston rod comprises a first portion having a reduced diameter section upon which said second piston and the shims are mounted, and a second portion receiving the reduced diameter section of the piston rod first portion and upon which said first piston is mounted, the shims being secured to said second piston by a disc-shaped element provided between the shims and the piston rod first portion other than the reduced diameter section.

17. A shock absorber as recited in claim 14, wherein said piston rod comprises a first portion having a reduced diameter section upon which said second piston and the shims are mounted, and a second portion receiving the reduced diameter section of the piston rod first portion and upon which said first piston is mounted, the shims being forced against said second piston by the piston rod second portion.

18. A shock absorber as recited in claim 1, wherein said piston rod comprises a first portion having a reduced diameter section upon which said second piston is mounted, and a second portion receiving the reduced diameter section of the piston rod first portion and upon which said first piston is mounted.

19. A shock absorber as recited in claim 1, wherein said piston rod comprises a first portion having a reduced diameter section upon which said second piston is mounted, and a second portion receiving the reduced diameter section of the piston rod first portion and upon which said first piston is mounted, said piston rod further comprising a passageway longitudinally provided through its first portion, the passageway having an operating rod extending therethrough, wherein the bleed means comprises a nozzle provided at one end of the passageway.

20. A shock absorber as recited in claim 19, wherein the passageway of said piston rod communicates with the second fluid chamber via at least one side hole formed in said piston rod, the at least one side hole being adjacent the nozzle.

21. A shock absorber as recited in claim 1, wherein an opening with a spring-biased ball is provided within said second piston.

22. A shock absorber comprising:

a cylinder defining an internal bore;

a piston rod extending into the internal bore;

first and second pistons fixedly attached to said piston rod and dividing the internal bore into at least first, second, and third fluid chambers, said first piston having at least one opening that provides a fluid flow path between the first and second fluid chambers and regulates a damping force in a first end of said cylinder;

at least one bleed means that provides a bleed flow path between the second and third fluid chambers, said bleed means being provided within said piston rod, wherein a thickened wall portion of said cylinder encloses said first piston, the thickened wall portion of said cylinder being provided in the first fluid chamber.

* * * * *